United States Patent
Wiedenhoefer

(10) Patent No.: US 12,298,080 B2
(45) Date of Patent: May 13, 2025

(54) CONFORMAL HEAT EXCHANGER

(71) Applicant: RTX Corporation, Farmington, CT (US)

(72) Inventor: James Fredric Wiedenhoefer, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 135 days.

(21) Appl. No.: 18/165,256

(22) Filed: Feb. 6, 2023

(65) Prior Publication Data

US 2023/0251040 A1     Aug. 10, 2023

Related U.S. Application Data

(60) Provisional application No. 63/308,635, filed on Feb. 10, 2022.

(51) Int. Cl.
| | | |
|---|---|---|
| *F28D 1/03* | (2006.01) | |
| *F28D 21/00* | (2006.01) | |
| *F28F 3/02* | (2006.01) | |

(52) U.S. Cl.
CPC ............ *F28D 1/0358* (2013.01); *F28F 3/027* (2013.01); *F28D 2021/0026* (2013.01); *F28F 2215/04* (2013.01); *F28F 2275/061* (2013.01)

(58) Field of Classification Search
CPC  F28D 1/0358; F28D 2021/0026; F28F 3/027; F28F 2215/04; F28F 2275/061
USPC ........................................................ 165/152
See application file for complete search history.

(56) References Cited

U.S. PATENT DOCUMENTS

| | | | |
|---|---|---|---|
| 3,818,984 A * | 6/1974 | Nakamura | F28F 3/025 |
| | | | 165/157 |
| 4,505,419 A * | 3/1985 | Steeb | F28D 1/0471 |
| | | | 228/183 |
| 6,585,034 B2 | 7/2003 | Oswald | |
| 9,273,632 B2 * | 3/2016 | Ueda | F28D 1/035 |
| 9,732,702 B2 * | 8/2017 | Ueda | F28F 3/02 |
| 9,851,159 B2 * | 12/2017 | Cameron | F28D 9/0031 |
| 10,100,740 B2 | 10/2018 | Thomas | |
| 10,156,404 B2 | 12/2018 | Ueda | |
| 10,302,372 B2 * | 5/2019 | Minami | B21D 53/04 |
| 10,907,500 B2 | 2/2021 | Wong et al. | |
| 11,333,447 B2 * | 5/2022 | Yun | B29C 64/40 |

(Continued)

FOREIGN PATENT DOCUMENTS

| | | | |
|---|---|---|---|
| EP | 4286780 A1 * | 12/2023 | ........... B23K 1/0012 |
| JP | 54000254 A * | 6/1977 | |

(Continued)

OTHER PUBLICATIONS

Search Report issued in European Patent Application No. 23156171.3; Application Filing Date Feb. 10, 2023; Date of Mailing Jun. 15, 2023 (6 pages).

*Primary Examiner* — Jon T. Schermerhorn, Jr.
(74) *Attorney, Agent, or Firm* — CANTOR COLBURN LLP

(57) ABSTRACT

A heat exchanger is provided and includes parting sheets flat along a first axis and curved along a second axis perpendicular to the first axis, a fin sheet interposed between the parting sheets and corrugated along the first axis to form fins that are curved along the second axis and diffusion bonds formed along an entire length of a fin to diffusion bond the entire length of the fin to the parting sheets.

20 Claims, 4 Drawing Sheets

(56) References Cited

U.S. PATENT DOCUMENTS

| | | | |
|---|---|---|---|
| 2017/0219291 A1* | 8/2017 | Leemans | F28D 1/05366 |
| 2019/0301816 A1 | 10/2019 | Yun et al. | |
| 2023/0392880 A1* | 12/2023 | Wiedenhoefer | F28D 9/02 |
| 2024/0263884 A1* | 8/2024 | Wiedenhoefer | F28F 3/06 |

FOREIGN PATENT DOCUMENTS

| | | | |
|---|---|---|---|
| JP | S6213993 A | | 1/1987 |
| JP | 2005249330 A | * | 9/2005 |

* cited by examiner

CONFORMAL HEAT EXCHANGER

CROSS-REFERENCE TO RELATED APPLICATIONS

This application claims priority to U.S. Provisional Application Ser. No. 63/308,635 filed Feb. 10, 2022, the contents of which are hereby incorporated by reference in its entirety.

BACKGROUND

The present disclosure relates to heat exchangers and, more particularly, to a conformal heat exchanger design formed by a method of creating curved, annular plates using folded fins.

Heat exchanger (HX) performance in a system is often limited based on the number of layers contained within the HX. For example, in annular passages of a turbine engine, a packed, non-conformal HX typically includes multiple parting sheets that are disposed to separate interleaved fin layers and has a rectangular cross-section that does not fit perfectly into the curvature of the annular passage. This limits the number of layers that can be included in the HX and thus limits HX performance.

In an HX with an annular conformal geometry, the annular conformal geometry allows additional layers to be fit into the HX as compared to a non-conformal HX. This fills the flow domain with active heat transfer elements instead of inert blockages. As such, for a given performance target, the annular conformal HX can achieve improved performance levels with potentially lighter weight and lower pressure drop characteristics than non-conformal HX designs.

It is often the case, however, that a HX with an annular conformal geometry cannot be reliably manufactured due to the tendency of the various layers of the HX separating from one another during the manufacturing processes that provide for the curvatures of the annular conformal geometry. Accordingly, a need exists for a production method that allows for the formation of a conformal or curved HX using conventional folded heat exchanger fin packs.

BRIEF DESCRIPTION

According to an aspect of the disclosure, a heat exchanger is provided and includes parting sheets flat along a first axis and curved along a second axis perpendicular to the first axis, a fin sheet interposed between the parting sheets and corrugated along the first axis to form fins that are curved along the second axis and diffusion bonds formed along an entire length of a fin to diffusion bond the entire length of the fin to the parting sheets.

In accordance with additional or alternative embodiments, the diffusion bonds are formed by field assisted sintering technology/spark plasma sintering (FAST/SPS) processing.

In accordance with additional or alternative embodiments, the diffusion bonds are formed along respective entire lengths of a substantial number of the fins to diffusion bond the respective entire lengths of the substantial number of the fins to the parting sheets.

In accordance with additional or alternative embodiments, the diffusion bonds are formed along respective entire lengths of each fin to diffusion bond the respective entire lengths of each fins to the parting sheets.

In accordance with additional or alternative embodiments, the heat exchanger further includes side bars on opposite sides of the fin sheet.

In accordance with additional or alternative embodiments, the heat exchanger further includes an additional fin sheet abutting one of the parting sheets and being corrugated along the second axis to form fins that are curved along the first axis.

In accordance with additional or alternative embodiments, the fin sheet and the additional fin sheet have different thicknesses.

In accordance with additional or alternative embodiments, the parting sheets and the fin sheet form a layer and the heat exchanger includes multiple layers with neighboring layers being separated by an additional fin sheet.

In accordance with additional or alternative embodiments, curvatures along the second axis of the multiple layers differ.

According to an aspect of the disclosure, a conformal heat exchanger is provided for disposition within a curved passage and includes multiple layers. Each of the multiple layers includes first and second parting sheets, each flat along a first axis and curved along a second axis perpendicular to the first axis to conform to the curved passage, a fin sheet interposed between the first and second parting sheets and corrugated along the first axis to form fins that are curved along the second axis to conform to the curved passage, each fin including first and second sections for contacting the first and second parting sheets, respectively, and first and second diffusion bonds formed along respective entire lengths of the first and second sections, respectively, of a fin to diffusion bond the respective entire lengths of the first and second sections of the fin to the first and second parting sheets, respectively.

In accordance with additional or alternative embodiments, the first and second diffusion bonds are formed by field assisted sintering technology/spark plasma sintering (FAST/SPS) processing.

In accordance with additional or alternative embodiments, the first and second diffusion bonds are formed along respective entire lengths of the first and second sections, respectively, of a substantial number of the fins to diffusion bond the respective entire lengths of the first and second sections of the substantial number of the fins to the first and second parting sheets, respectively.

In accordance with additional or alternative embodiments, the first and second diffusion bonds are formed along respective entire lengths of the first and second sections, respectively, of each of the fins to diffusion bond the respective entire lengths of the first and second sections of each of the fins to the first and second parting sheets, respectively.

In accordance with additional or alternative embodiments, the conformal heat exchanger further includes side bars on opposite sides of the fin sheet in each of the multiple layers.

In accordance with additional or alternative embodiments, the conformal heat exchanger further includes an additional fin sheet interleaved between neighboring ones of the multiple layers and being corrugated along the second axis to form fins that are curved along the first axis.

In accordance with additional or alternative embodiments, the fin sheets and the additional fin sheets each have different thicknesses.

In accordance with additional or alternative embodiments, curvatures along the second axis of the multiple layers differ.

According to an aspect of the disclosure, a method of assembling a conformal heat exchanger is provided and includes forming a fin sheet flat and corrugated along a first axis to form fins extending along a second axis perpendicular to the first axis, interposing the fin sheet between parting sheets, executing field assisted sintering technology/spark plasma sintering (FAST/SPS) processing to form diffusion bonds along respective entire lengths of each fin to diffusion bond the respective entire lengths of each fin to the parting sheets and imparting a curvature to the parting sheets and the fin sheet along the second axis with the diffusion bonds surviving the imparting.

In accordance with additional or alternative embodiments, the fin sheet and the parting sheets form a layer of the conformal heat exchanger and the method further includes interleaving additional fin sheets between multiple layers to form an assembly and installing the assembly into a curved passage.

In accordance with additional or alternative embodiments, the imparting of the curvature for each of the multiple layers includes varying the curvature for each of the multiple layers.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
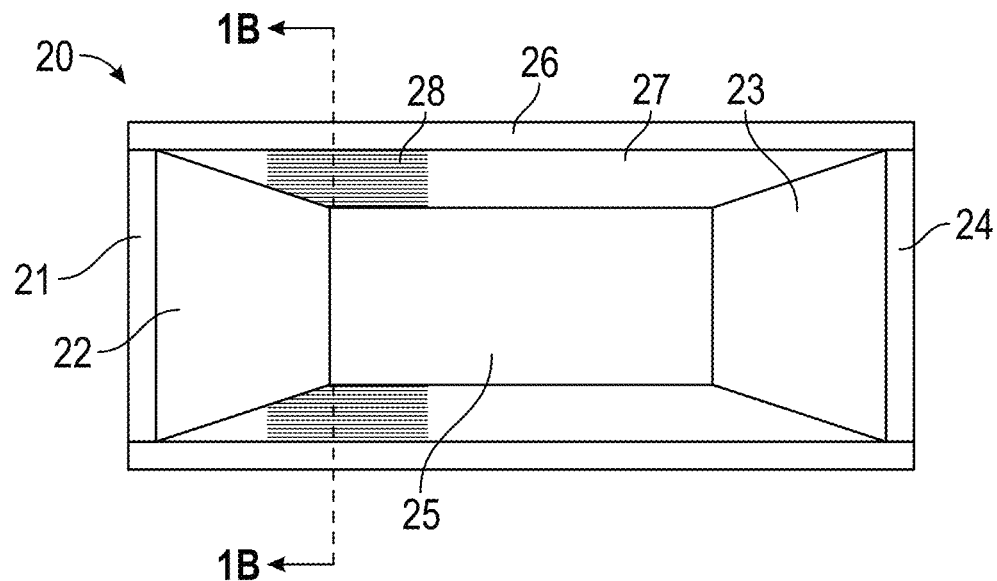
FIG. 1A is a side view of a gas turbine engine in accordance with embodiments.
Figure 1B:
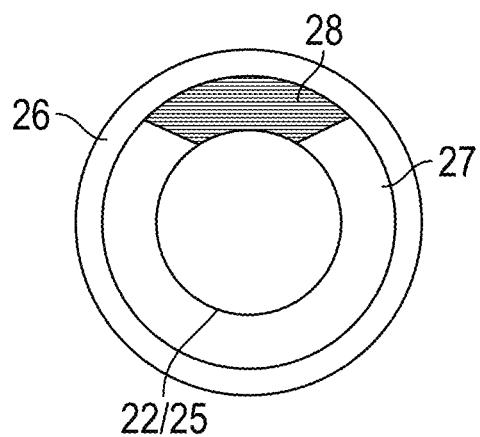
FIG. 1B is an axial view of the gas turbine engine of FIG. 1A taken along line 1B-1B in accordance with embodiments.

With reference to FIGS. 1A and 1B, a gas turbine engine 20 is provided and includes a fan section 21, a compressor section 22 aft of the fan section 21, a turbine section 23 aft of the compressor section 22 and a diffuser and/or afterburner section 24 aft of the turbine section 23. Inlet air enters the gas turbine engine 20 through the fan section 21 and is compressed in the compressor section 22. The compressed air is then mixed with fuel and combusted in a combustor 25 to produce high-temperature and high-pressure working fluid. The working fluid is then expanded in the turbine section 23 and optionally diffused or re-burned in the diffuser or afterburner section 24. The gas turbine engine 20 is at least partially encased in an outer wall 26, which surrounds at least the compressor section 22, to form a bypass duct 27. The bypass duct 27 is annular in shape. A heat exchanger 28 can be provided in the bypass duct 27. The gas turbine engine 20 can be provided as a turbofan engine or as any other similar type of engine.

Field assisted sintering technology (FAST) a.k.a. spark plasma sintering (SPS) are consolidation processes that are executed at temperatures lower than the melting point of the subject materials. Similar to hot pressing, FAST forms bonds between materials but at temperatures ~200° C. lower. FAST utilizes a high amperage, pulsed direct current (DC) electrical current to heat the subject materials to be bonded through a combination of Joule and plasma heating, while under uniaxial compression. The consolidation is a combination of solid-state transport mechanisms including primarily diffusion and creep. The result is a metallurgical bond between the materials to be joined. Consolidation or joining can be accomplished in a variety of conductive and non-conductive materials and forms.

Recently, FAST/SPS has been gaining acceptance starting in the 1990s for solidification of powdered metals. Due to the lower processing temperatures of FAST/SPS over other consolidation methods, FAST/SPS mitigates significant grain growth common in other diffusional bonding methods. In some cases, bonding two solid metallic materials using the FAST process has been demonstrated. Material pairs included a same alloy (e.g., PWA 1429) and dissimilar alloys (e.g., PWA 1429 to CM247). Additionally, the ability to bond both single crystal (SX) and equiaxed (EQ) materials and the ability to retain fine features along bond surfaces or lines has been demonstrated.

As will be described below, a heat exchanger with a compound fin-plate structure is provided for use as the heat exchanger 28 of FIGS. 1A and 1B and can be formed by bonding individual parting sheets to a conventional fin pack using FAST/SPS processing to create integral bonds in which metallic crystals mix. The resulting diffusion bond in inherently different from a brazed bond, for example, in that, when the compound fin-plate structure is run through a plate roller to impart curvature, the resulting diffusion bond is able to stretch and compress whereas a brazed structure would crack at the braze material. Thus, FAST/SPS processing is employed to join parting sheets and conventional fin packs to form a compound fin-plate structure that conforms to an annular passage, such as the bypass duct 27 of the gas turbine engine 20 of FIGS. 1A and 1B, or another system using annular passages.

Figure 2A:
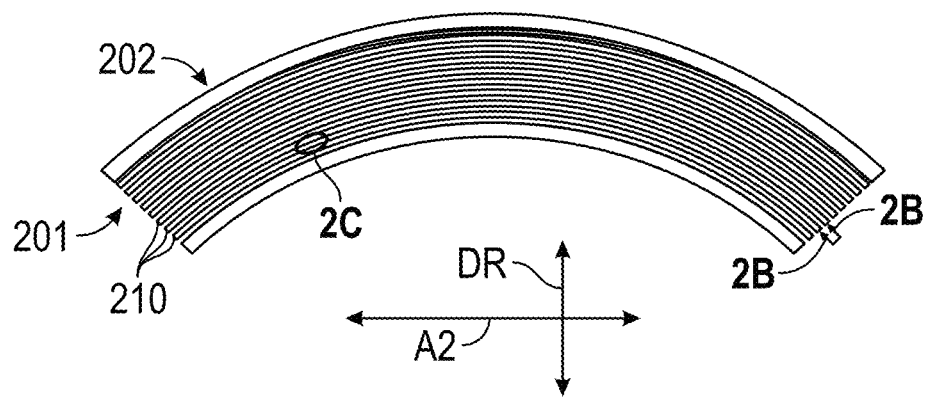
FIG. 2A is a schematic illustration of a conformal heat exchanger in accordance with embodiments.
Figure 2B:
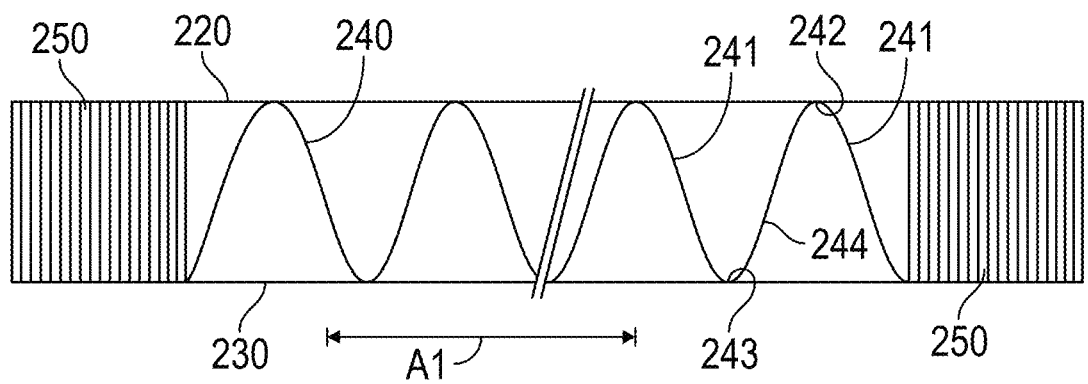
FIG. 2B is a cross sectional view of a layer of the conformal heat exchanger of FIG. 2A taken along line 2B-2B of FIG. 2A in accordance with embodiments.
Figure 2C:
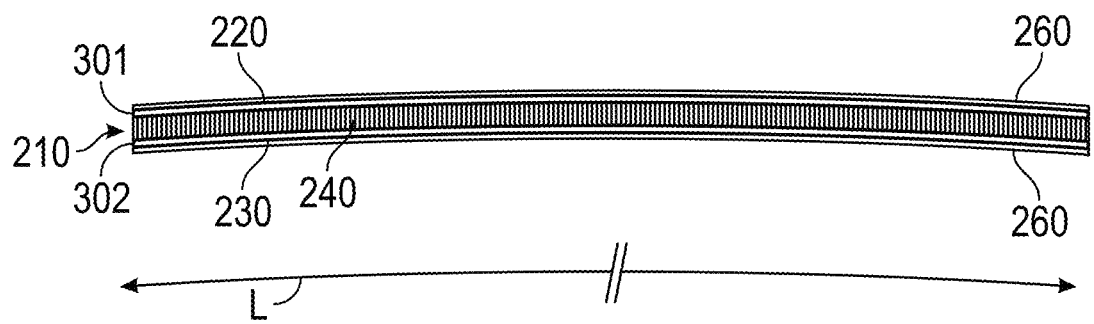
FIG. 2C is an enlarged view of a portion of a layer of the conformal heat exchanger of FIG. 2A encircled by line 2C in accordance with embodiments.

With reference to FIGS. 2A, 2B and 2C, a conformal heat exchanger 201 is provided for disposition within a curved passage 202 of a heat exchanger system, such as the bypass duct 27 of the gas turbine engine 20 of FIGS. 1A and 1B. The conformal heat exchanger 201 includes multiple layers 210 with each layer 210 including a first parting sheet 220, a second parting sheet 230 and a fin sheet 240 with side bars 250. The first parting sheet 220 is flat along a first axis A1 and curved along a second axis A2, which is perpendicular to the first axis A1 to conform to a curvature of the curved passage 202. The second parting sheet 230 is similarly flat along the first axis A1 and curved along the second axis A2 to conform to the curvature of the curved passage 202. The fin sheet 240 is interposed between the first and second parting sheets 220 and 230 and is corrugated along the first axis A1. The side bars 250 are provided on opposite sides of the fin sheet 240 in each of the multiple layers 210.

In accordance with embodiments, the conformal heat exchanger 201 can also include additional fin sheets 260 (see FIG. 2C) that are respectively interleaved between neighboring ones of the multiple layers 210. These additional fin sheets 260 can be corrugated along the second axis A2 to form fins that are curved along the first axis A1. The fin sheets 240 of the multiple layers 210 and the additional fin sheets 260 can each have different thicknesses measured in the radial dimension DR.

With the construction described above, each of the multiple layers 210 of the conformal heat exchanger 201 has a curvature along the second axis A2 that conforms to the curvature of the curved passage 202. In this way, the curvatures along the second axis of the multiple layers 210 differ, and decrease with increased distance along the radial dimension DR.

The corrugation of the fin sheet 240 forms fins 241 that are curved along the second axis A2 to conform to the curvature of the curved passage 202. Each fin 241 includes a first section 242 for contacting the first parting sheet 220, a second section 243 for contacting the second parting sheet 230 and a substantially-vertical section 244 that extends between the first and second sections 242 and 243.

The conformal heat exchanger 201 further includes first diffusion bonds 301 and second diffusion bonds 302. The first diffusion bonds 301 and the second diffusion bonds 302 are formed along respective entire lengths L of the first and second sections 242 and 243, respectively, of a fin 241 to thereby diffusion bond the respective entire lengths L of the first and second sections 242 and 243 of the fin 241 to the first and second parting sheets 220 and 230, respectively.

The first and second diffusion bonds 301 and 302 can be formed by FAST/SPS processing. As such, when a curvature is applied to the first and second parting sheets 220 and 230 and to the fin sheet 240 during an assembly of the conformal heat exchanger 201 (see below), the diffusion bonds will survive the process of imparting the curvature and remain present in the conformal heat exchanger 201.

In accordance with embodiments, the first and second diffusion bonds 301 and 302 can be formed along the respective entire lengths L of the first and second sections 242 and 243, respectively, of a substantial number of the fins 241 to diffusion bond the respective entire lengths L of the first and second sections 242 and 243 of the substantial number of the fins 241 to the first and second parting sheets 220 and 230, respectively. In accordance with further embodiments, the first and second diffusion bonds 301 and 302 can be formed along respective entire lengths L of the first and second sections 242 and 243, respectively, of each of the fins 241 to diffusion bond the respective entire lengths L of the first and second sections 242 and 243 of each of the fins 241 to the first and second parting sheets 220 and 230, respectively.

Figure 3:
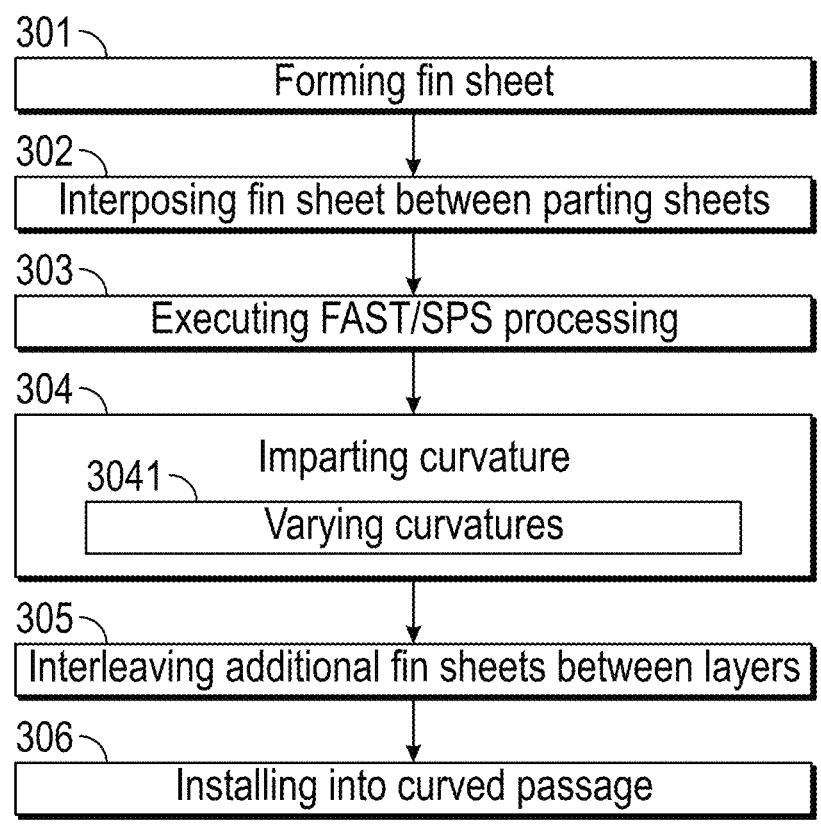
FIG. 3 is a flow diagram illustrating a method of assembling a conformal heat exchanger in accordance with embodiments.
Figure 4:
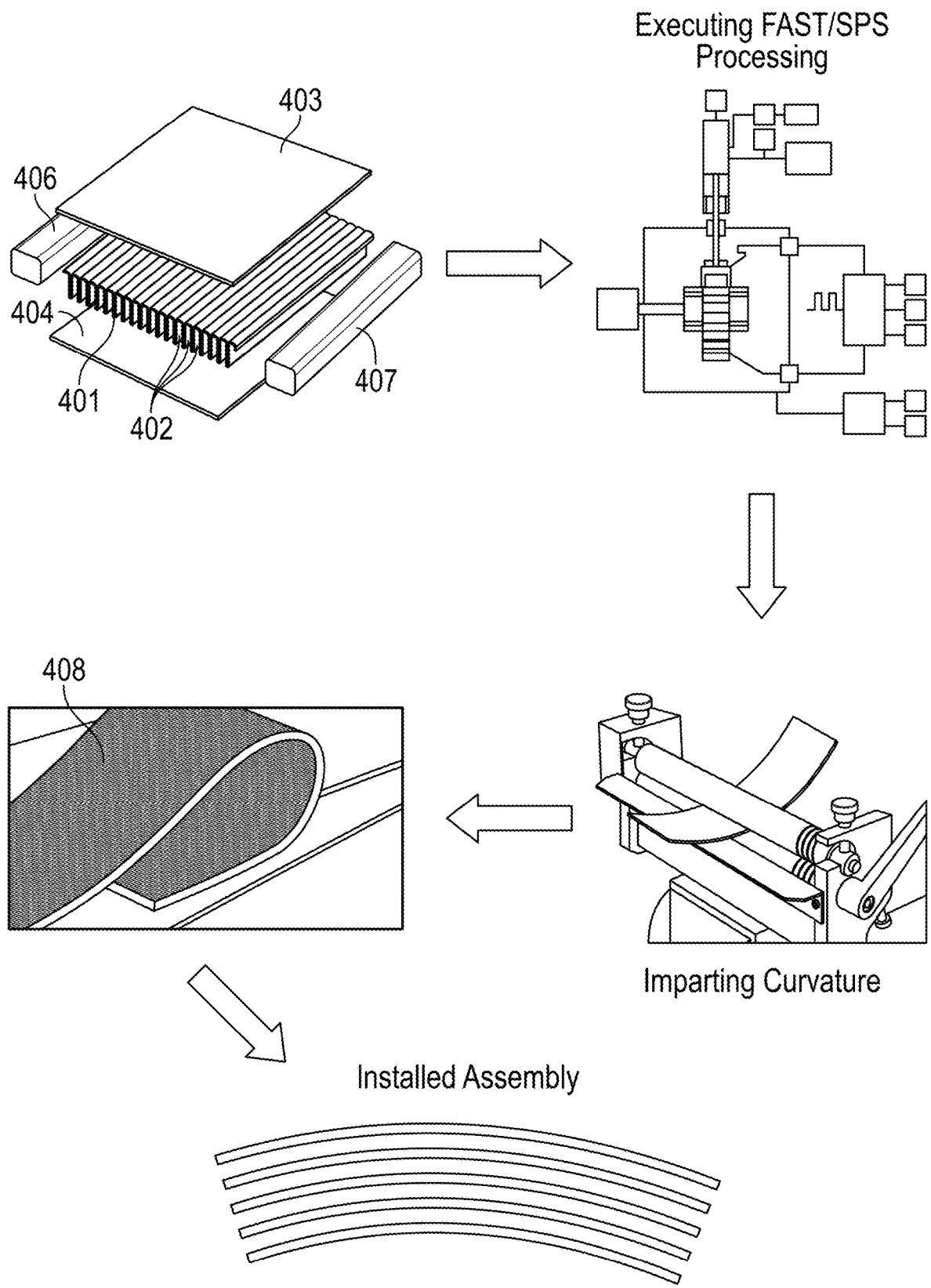
FIG. 4 is an illustrative diagram illustrating the method of FIG. 3 in accordance with embodiments.

With reference to FIGS. 3 and 4, a method of assembling a conformal heat exchanger, such as the conformal heat exchanger 201 described above is provided. The method includes forming a fin sheet 401, which is flat and corrugated along a first axis to form fins 402 that extend along a second axis perpendicular to the first axis (block 301) and interposing the fin sheet 401 between parting sheets 403 and 404 (block 302) along with side bars 406 and 407. The method further includes executing FAST/SPS processing to form diffusion bonds along respective entire lengths of each fin 402 to diffusion bond the respective entire lengths of each fin 402 to the parting sheets 403 and 404 (block 303). Next, the method includes imparting a curvature to the parting sheets 403 and 404 and to the fin sheet 401 along the second axis with the diffusion bonds surviving the imparting (block 304).

The operations described above result in the fin sheet 401, the parting sheets 403 and 404 and the side bars 406 and 407 forming a layer of the conformal heat exchanger and the method can further include interleaving additional fin sheets 408 between multiple layers to form an assembly (block 305) and subsequently installing the assembly into a curved passage (block 306).

In accordance with embodiments, the imparting of the curvature for each of the multiple layers of operation 404 can include varying the curvature for each of the multiple layers (block 3041).

Technical effects and benefits of the present disclosure are the use of FAST/SPS processing to join parting sheets and conventional fin packs to form a compound fin-plate structure that conforms to an annular passage in a gas turbine engine, such as the gas turbine engine 20 of FIGS. 1A and 1B, or another system using annular passages.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:
1. A heat exchanger, comprising:
parting sheets flat along a first axis and curved along a second axis perpendicular to the first axis;
a fin sheet interposed between the parting sheets and corrugated along the first axis to form fins that are curved along the second axis; and
diffusion bonds formed along an entire length of a fin to diffusion bond the entire length of the fin to the parting sheets.
2. The heat exchanger according to claim 1, wherein the diffusion bonds are formed by field assisted sintering technology/spark plasma sintering (FAST/SPS) processing.
3. The heat exchanger according to claim 1, wherein the diffusion bonds are formed along respective entire lengths of a substantial number of the fins to diffusion bond the respective entire lengths of the substantial number of the fins to the parting sheets.
4. The heat exchanger according to claim 1, wherein the diffusion bonds are formed along respective entire lengths of each fin to diffusion bond the respective entire lengths of each fins to the parting sheets.
5. The heat exchanger according to claim 1, further comprising side bars on opposite sides of the fin sheet.
6. The heat exchanger according to claim 1, further comprising an additional fin sheet abutting one of the parting sheets and being corrugated along the second axis to form fins that are curved along the first axis.

7. The heat exchanger according to claim 6, wherein the fin sheet and the additional fin sheet have different thicknesses.

8. The heat exchanger according to claim 6, wherein:
the parting sheets and the fin sheet form a layer, and
the heat exchanger comprises multiple layers with neighboring layers being separated by an additional fin sheet.

9. The heat exchanger according to claim 8, wherein curvatures along the second axis of the multiple layers differ.

10. A conformal heat exchanger for disposition within a curved passage and comprising multiple layers each comprising:
first and second parting sheets, each flat along a first axis and curved along a second axis perpendicular to the first axis to conform to the curved passage;
a fin sheet interposed between the first and second parting sheets and corrugated along the first axis to form fins that are curved along the second axis to conform to the curved passage, each fin comprising first and second sections for contacting the first and second parting sheets, respectively; and
first and second diffusion bonds formed along respective entire lengths of the first and second sections, respectively, of a fin to diffusion bond the respective entire lengths of the first and second sections of the fin to the first and second parting sheets, respectively.

11. The conformal heat exchanger according to claim 10, wherein the first and second diffusion bonds are formed by field assisted sintering technology/spark plasma sintering (FAST/SPS) processing.

12. The conformal heat exchanger according to claim 10, wherein the first and second diffusion bonds are formed along respective entire lengths of the first and second sections, respectively, of a substantial number of the fins to diffusion bond the respective entire lengths of the first and second sections of the substantial number of the fins to the first and second parting sheets, respectively.

13. The conformal heat exchanger according to claim 10, wherein the first and second diffusion bonds are formed along respective entire lengths of the first and second sections, respectively, of each of the fins to diffusion bond the respective entire lengths of the first and second sections of each of the fins to the first and second parting sheets, respectively.

14. The conformal heat exchanger according to claim 10, further comprising side bars on opposite sides of the fin sheet in each of the multiple layers.

15. The conformal heat exchanger according to claim 10, further comprising an additional fin sheet interleaved between neighboring ones of the multiple layers and being corrugated along the second axis to form fins that are curved along the first axis.

16. The conformal heat exchanger according to claim 15, wherein the fin sheets and the additional fin sheets each have different thicknesses.

17. The conformal heat exchanger according to claim 10, wherein curvatures along the second axis of the multiple layers differ.

18. A method of assembling a conformal heat exchanger, the method comprising:
forming a fin sheet flat and corrugated along a first axis to form fins extending along a second axis perpendicular to the first axis;
interposing the fin sheet between parting sheets;
executing field assisted sintering technology/spark plasma sintering (FAST/SPS) processing to form diffusion bonds along respective entire lengths of each fin to diffusion bond the respective entire lengths of each fin to the parting sheets; and
imparting a curvature to the parting sheets and the fin sheet along the second axis with the diffusion bonds surviving the imparting.

19. The method according to claim 18, wherein:
the fin sheet and the parting sheets form a layer of the conformal heat exchanger; and
the method further comprises interleaving additional fin sheets between multiple layers to form an assembly and installing the assembly into a curved passage.

20. The method according to claim 19, wherein the imparting of the curvature for each of the multiple layers comprises varying the curvature for each of the multiple layers.

* * * * *